(12) United States Patent
Araya (10) Patent No.: US 7,253,950 B2
(45) Date of Patent: Aug. 7, 2007

(54) SCANNING LASER MICROSCOPE (75) Inventor: Akinori Araya, Yokohama (JP)

(73) Assignee: Olympus Corporation, Tokyo (JP)

( * ) Notice: Subject to any disclaimer, the term of this patent is extended or adjusted under 35 U.S.C. 154(b) by 367 days.

(21) Appl. No.: 10/891,475

(22) Filed: Jul. 13, 2004

(65) Prior Publication Data
US 2005/0012993 A1 Jan. 20, 2005

(30) Foreign Application Priority Data
Jul. 17, 2003 (JP) .............................. 2003-198461

(51) Int. Cl.
*G02B 21/06* (2006.01)
(52) U.S. Cl. ...................... 359/388; 359/385; 359/305; 359/306; 359/307
(58) Field of Classification Search ................ 359/484, 359/385, 388, 305–307
See application file for complete search history.

(56) References Cited

U.S. PATENT DOCUMENTS 6,269,206 B1 * 7/2001 Simon et al. .................. 385/31

OTHER PUBLICATIONS

Design and Fabrication of Acousto-Optic Devices, by A.P. Goutzoulis et al; Marcel Dekker, Inc., 1994, pp. 246-259.

* cited by examiner

*Primary Examiner*—Stephone B. Allen
*Assistant Examiner*—Joshua L. Pritchett
(74) *Attorney, Agent, or Firm*—Frishauf, Holtz, Goodman & Chick, P.C.

(57) ABSTRACT

A scanning laser microscope is provided which includes at least one laser light source for emitting laser light, a plurality of modulating sections for adjusting the laser light emitted from each laser light source, a storage section for storing delay time information on an input/output of each modulating section, and signal production section for producing a driving signal to drive at least one modulating section selected from the plurality of modulating sections based on the delay time information of the at least one selected modulating section. The delay time information includes information on a response time from a start of driving to development of a function of each modulating section.

20 Claims, 6 Drawing Sheets

SCANNING LASER MICROSCOPE

CROSS-REFERENCE TO RELATED APPLICATIONS

This application is based upon and claims the benefit of priority from prior Japanese Patent Application No. 2003-198461, filed Jul. 17, 2003, the entire contents of which are incorporated herein by reference.

BACKGROUND OF THE INVENTION

1. Field of the Invention

The present invention relates to a scanning laser microscope.

2. Description of the Related Art

Scanning laser microscopes are capable of optically slicing samples such as living cells and tissues without damaging the samples, and obtaining a plurality of two-dimensional tomogram images to obtain three-dimensional images from the plurality of two-dimensional tomogram images.

In the scanning laser microscope which observes a living sample, a fluorescent reagent or fluorescent protein introduced into the sample is irradiated with laser light, and fluorescence is measured from the sample and formed into an image. In this case, when a plurality of types of fluorescent reagents or fluorescent proteins are introduced into the sample, it is possible to observe a plurality of chemical substances in the cell. To excite these types of fluorescent substances, excitation laser light having a plurality of wavelengths is necessary.

On the other hand, a color degradation phenomenon occurs in which a fluorescent amount from the fluorescent substance decreases with elapse of an irradiation time of the excitation light. To solve the problem, a method has heretofore been proposed in which unnecessary excitation light is interrupted to prevent the color degradation as much as possible in the scanning laser microscope.

Figure 9:
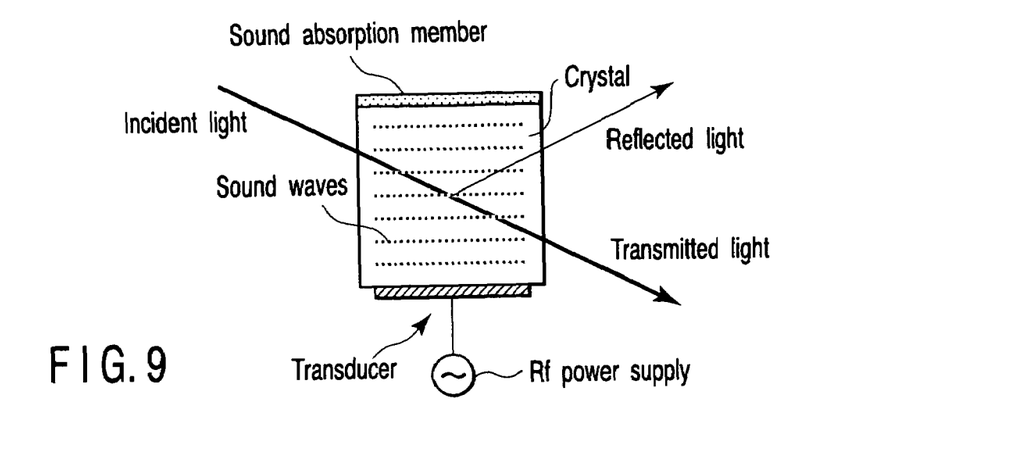
FIG. 9 is a diagram showing an acoustooptic device according to a conventional example.

For example, in an optical path, a shutter or an optical filter is mechanically inserted, or an acoustooptic device (AOTF, AOD, AOM, etc.) described in a document (AKIS P. GOUTZOULIS and DENNIS R. PAPE, DESIGN AND FABRICATION OF ACOUSTO-OPTIC DEVICES, Marcel Dekker, Inc., 1994, pp. 246-259) and shown in FIG. 9, EOM or the like is inserted. Accordingly, in accordance with an irradiation position, an intensity of laser light is adjusted, and the wavelength is selected in a set procedure, and the laser light having a desired wavelength and intensity can be applied only to a desired portion. As shown in FIG. 9, the acoustooptic device is capable of producing sound waves therein by an electric signal from the outside to make a refractive index change in the device. The refractive index change makes it possible that transmittance of incident light is controlled.

Figure 10:
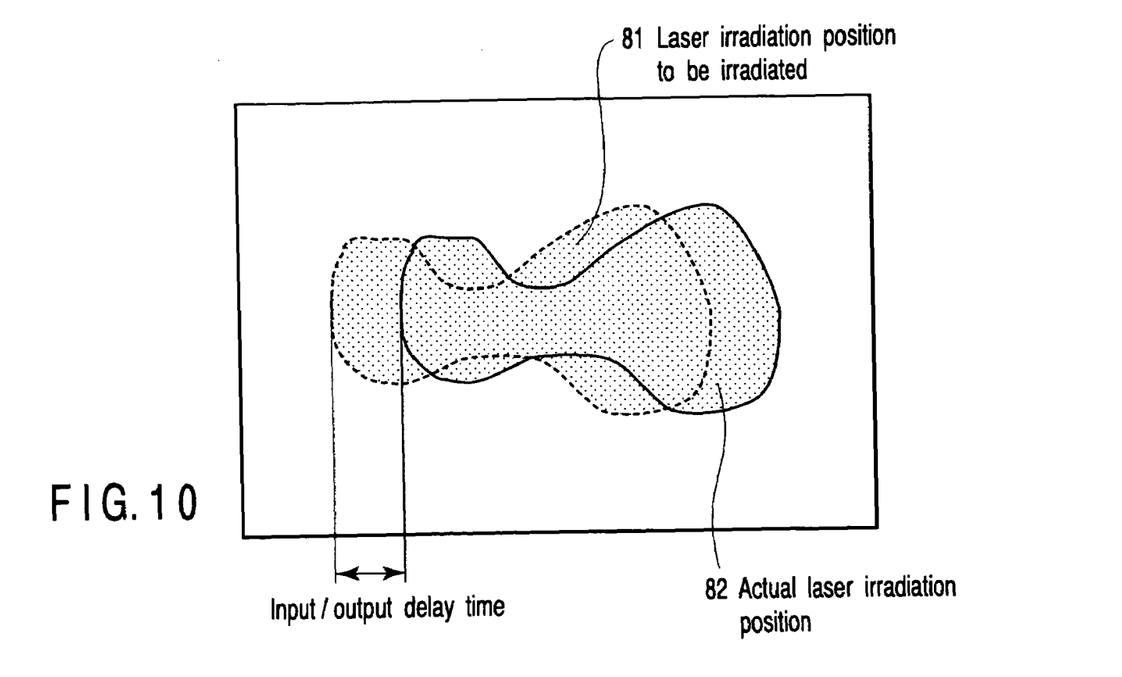
FIG. 10 is a diagram showing a laser irradiation position according to the conventional example.

When data is obtained in a time series by use of a plurality of laser wavelengths, a plurality of modulating sections need to be used in performing the control. However, in this case, when a plurality of modulating sections are driven with a single synchronous signal, a difference is made in a response time from when the electric signal is supplied to the acoustooptic device until the function (change of the refractive index) is developed, that is, a delay time by a difference of the type of the acoustooptic device. As a result, as shown in FIG. 10, an actual laser irradiation position 82 shifts from a laser irradiation position 81 to be irradiated by a user in each modulating section.

BRIEF SUMMARY OF THE INVENTION

An object of the present invention is to provide a scanning laser microscope which is capable of exactly controlling an irradiation position in a case where a plurality of modulating sections are used.

A scanning laser microscope of the present invention comprises at least one laser light source, a plurality of modulating sections for adjusting each laser light emitted from each laser light source, storage section for storing delay time information on an input/output of each modulating section, and signal production section for producing a driving signal to drive the modulating section selected from the plurality of modulating section based on the delay time information of the selected modulating section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described hereinafter with reference to the drawings.

Figure 1:
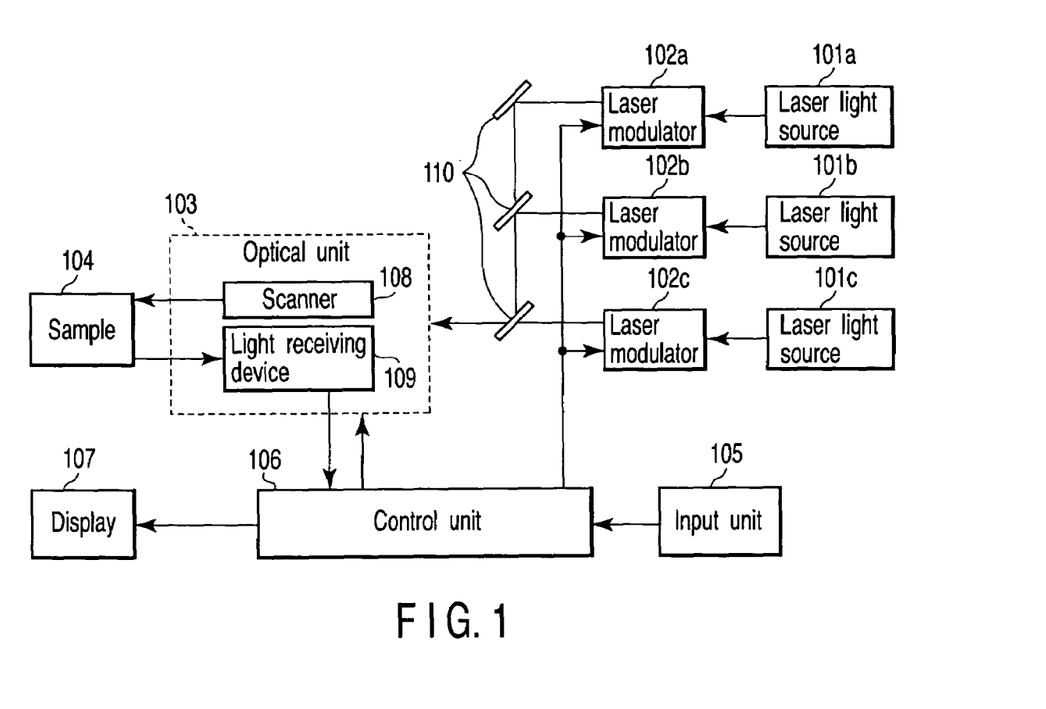
FIG. 1 is a diagram showing a configuration of a scanning laser microscope according to a first embodiment of the present invention.

FIG. 1 is a diagram showing a configuration of a scanning laser microscope according to a first embodiment of the present invention. The scanning laser microscope includes a plurality of types of acoustooptic devices for changing a quantity and wavelength of excitation light.

Each of a plurality of laser light sources (laser light irradiation means) 101a, 101b, 101c is a light source for excitation. Laser light (laser beam) emitted from each laser light source 101a, 101b, 101c individually enters one of a plurality of laser modulators 102a, 102b, 102c. Each laser modulator 102a, 102b, 102c can change at least one of a wavelength and quantity (intensity) of laser light irradiated to a sample in accordance with the scanning position of laser light. Each laser modulator 102a, 102b, 102c is, for example, configured with an acoustooptic device (AOTF), a combination of a shutter and a filter, or the like.

The laser lights emitted from the respective laser modulators 102a, 102b, 102c are combined into one laser light by a plurality of optical coupling units 110, and enter a scanner section 108 of an optical unit 103. The optical unit 103 is constituted of the scanner section 108 and a light receiving device 109. The scanner section (scanning section) 108 two-dimensionally scans a sample 104 by use of the laser light coupled by the optical coupling units 110. The light receiving device 109 detects fluorescence from the sample 104, and outputs a voltage signal of the fluorescence to a control unit 106.

The control unit 106 converts the voltage signal from the light receiving device 109 into image data. The image data is sent to a display 107 from the control unit 106, and displayed. The control unit 106 controls the respective laser modulators 102a, 102b, 102c and optical unit 103. In an input unit 105, an instruction to the control unit 106 is input.

Figure 2:
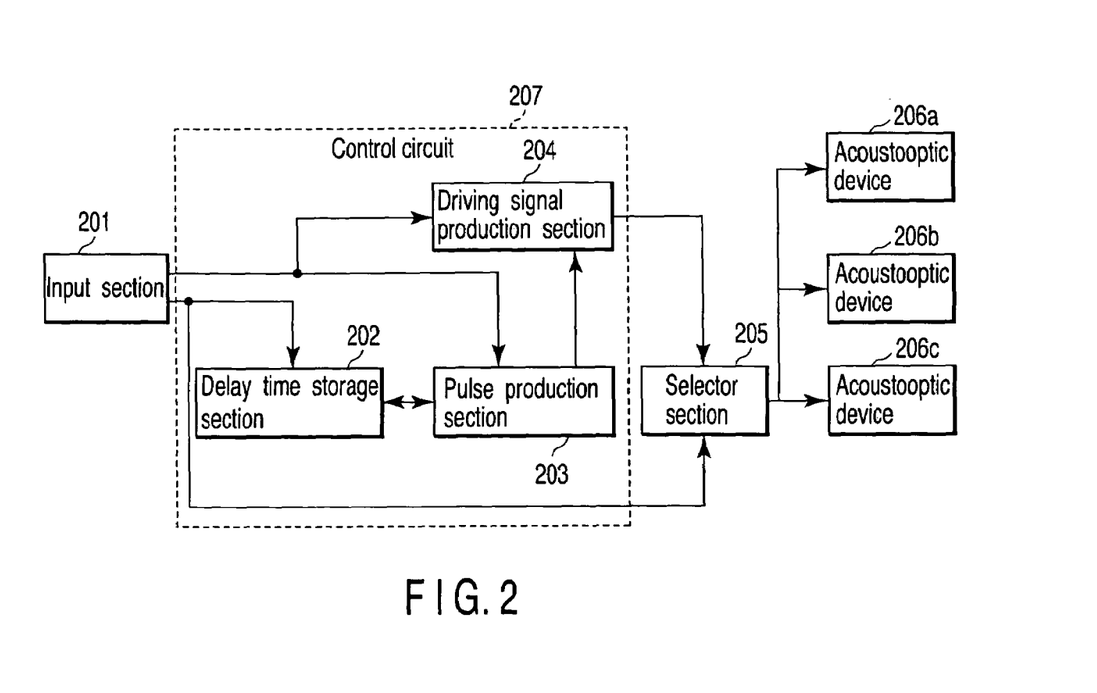
FIG. 2 is a diagram showing a configuration of a part of the scanning laser microscope according to the first embodiment of the present invention in detail.

FIG. 2 is a diagram showing a configuration of a part of the scanning laser microscope shown in FIG. 1 in detail. In FIG. 2, modulators (acoustooptic devices 206a, 206b, 206c herein) are driven by a driving signal produced in response to an input signal.

In FIG. 2, the microscope is configured with an input section (setting section) 201, a control circuit 207, a selector section 205, and a plurality of acoustooptic devices 206a, 206b, 206c. The control circuit 207 is constituted of a delay time storage section 202, a pulse production section 203, and a driving signal production section 204. The control circuit 207 and the selector section 205 are included in the control unit 106 of FIG. 1. The acoustooptic devices 206a, 206b, 206c correspond to the laser modulators 102a, 102b, 102c of FIG. 1. The input section 201 corresponds to the input unit 105 of FIG. 1.

In the input section 201, a user inputs laser irradiation range data (laser light irradiation information) indicating a laser irradiation range, a laser scanning synchronous signal indicating a laser scanning method, and acoustooptic device data indicating information of the selected acoustooptic device 206a, 206b, 206c.

In the delay time storage section 202, delay time data of the input/output inherent in each acoustooptic device 206a, 206b, 206c, that is, data of a response time from when the driving starts by an electric signal until the function is developed is stored. The delay time data to be used is determined from the delay time data stored in the delay time storage section 202 in accordance with the acoustooptic device data input from the input section 201. That is, the delay time data necessary for each acoustooptic device 206a, 206b, 206c is selectively called from the delay time storage section 202.

The pulse production section 203 produces a trigger pulse from the laser irradiation range data and the laser scanning synchronous signal from the input section 201 and the delay time data called from the delay time storage section 202.

The driving signal production section 204 produces a driving signal for driving the corresponding acoustooptic device 206a, 206b, 206c from the laser irradiation range data and the laser scanning synchronous signal from the input section 201 and the trigger pulse from the pulse production section 203.

The selector section 205 guides the driving signal from the driving signal production section 204 to one of the acoustooptic devices 206a, 206b, 206c designated at an input time in accordance with the acoustooptic device data from the input section 201. The control circuit 207 controls the acoustooptic devices (modulating sections) 206a, 206b, 206c in a time series as described later.

Figure 3:
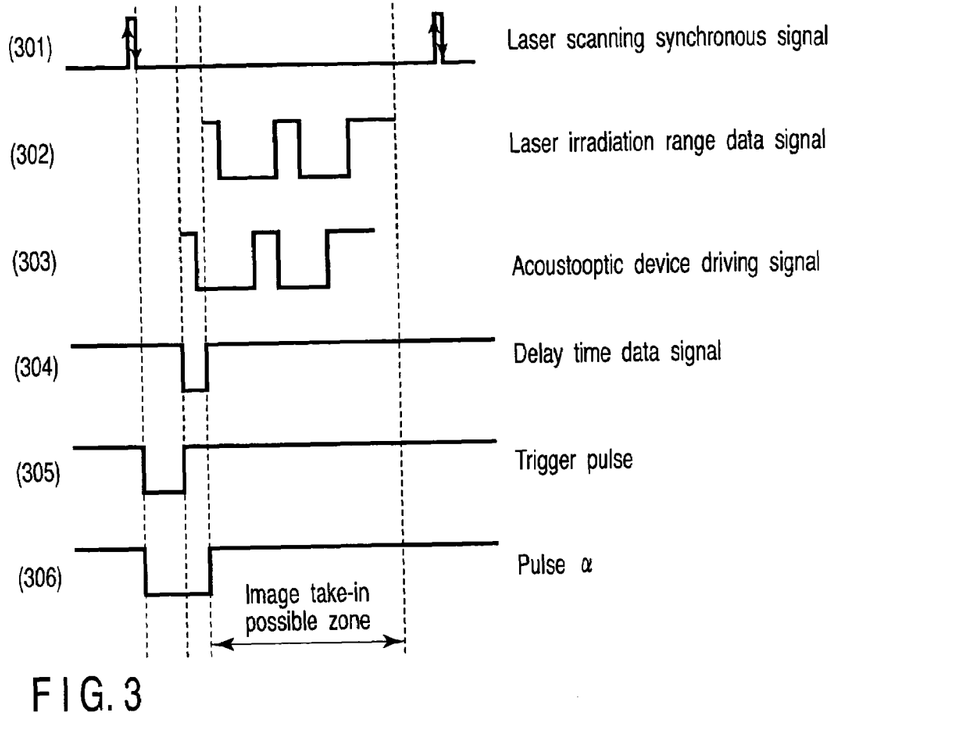
FIG. 3 is a timing chart of each signal necessary for obtaining a driving signal from an input signal according to the embodiment of the present invention.

FIG. 3 is a timing chart of each signal necessary for obtaining the driving signal from the input signal. A procedure for obtaining an acoustooptic device driving signal 303 will be described hereinafter with reference to FIG. 3.

First, by use of the input section (setting section) 201, the user inputs information indicating one of the acoustooptic devices 206a, 206b, 206c to be used, the laser wavelength, or the laser light source (any one is assumed as the acoustooptic device data), a laser scanning synchronous signal 301, and a laser irradiation range data signal 302.

When the user inputs the laser irradiation range data signal 302, the irradiation range of the laser light having the wavelength shown by the acoustooptic device data may be specified, for example, by specifying desired region on the observation image, which is previously obtained, displayed on the display 107 with a mouse of the input section 201. Additionally, when specifying the irradiation range of the laser light, the intensity of the laser light to be emitted may be specified by use of the input section 201. That is, the user sets an adjusted value of at least one of the intensity and the wavelength of the laser light with respect to a scanning point of the laser light scanned by the scanner section 108 with the input section 201. The adjusted value is set as laser light irradiation information. Thus, by setting the laser light irradiation information showing that the laser light having specific intensity and/or specific wavelength is irradiated with respect to the specific irradiation range, at least one of the intensity and the wavelength of laser light can be changed by the modulator according to the scanning point of the laser light.

The acoustooptic device data output from the input section 201 is input into the delay time storage section 202. In the delay time storage section 202, the delay time for each acoustooptic device 206a, 206b, 206c is stored. A delay time data signal 304 of one of the acoustooptic devices 206a, 206b, 206c selected by the user is selected from the delay time storage section 202. The laser scanning synchronous signal 301 and the laser irradiation range data signal 302 output from the input means 201 are input into the pulse production section 203.

The pulse production section 203 starts counting, when the laser scanning synchronous signal 301 falls or rises, and finishes counting at a start of the laser irradiation range data signal 302 to produce a pulse a 306. The pulse production section 203 produces a trigger pulse 305 from a difference between the produced pulse α 306 and the delay time data signal 304 output from the delay time storage section 202. The trigger pulse 305 output from the pulse production section 203 is input into the driving signal production section 204.

The driving signal production section 204 starts operation of the trigger pulse 305 from the pulse production section 203 in synchronization with the falling or the rising of the laser scanning synchronous signal 301, and starts the operation of the laser irradiation range data signal 302 at the end of the trigger pulse 305 to produce the acoustooptic device driving signal 303. Accordingly, the acoustooptic device 206a, 206b, 206c can be driven earlier by the delay time with respect to the laser irradiation range data signal 302.

The selector section 205 inputs the acoustooptic device data output from the input section 201, selects one of the acoustooptic devices 206a, 206b, 206c to be used, and outputs the acoustooptic device driving signal 303 output from the driving signal production section 204 to one of the acoustooptic devices 206a, 206b, 206c selected by the user. The corresponding acoustooptic device is driven by the driving signal 303.

Figure 4:
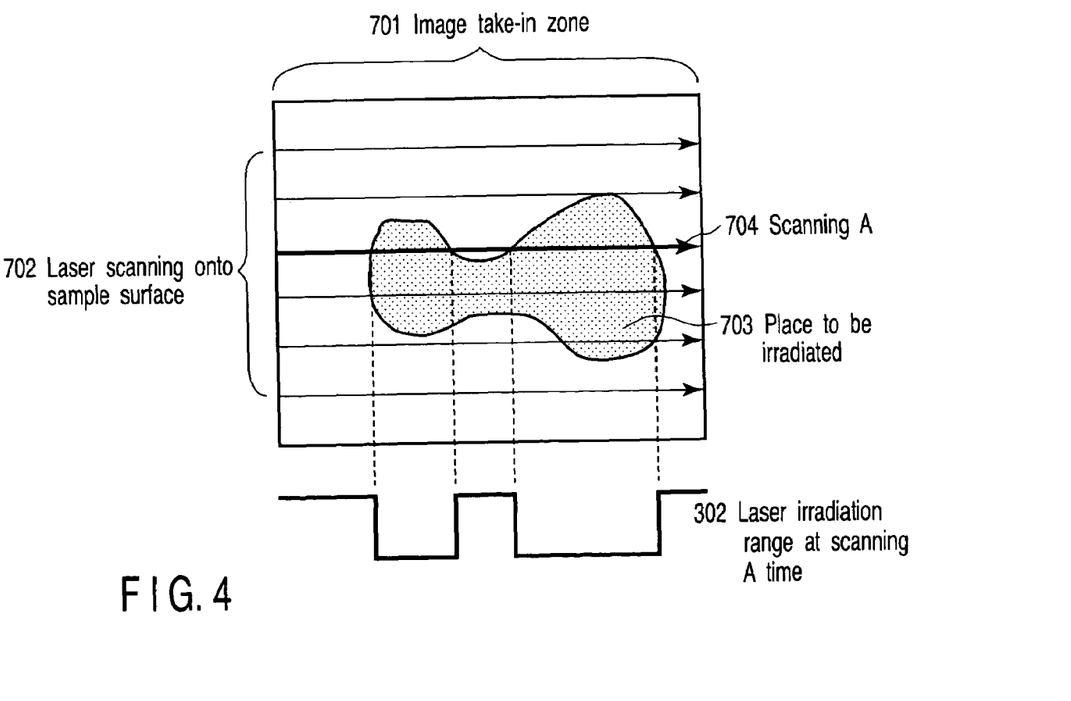
FIG. 4 is a diagram showing a state of laser scanning and a state of application of laser to a place to be irradiated according to the first embodiment of the present invention together with signals.

FIG. 4 is a diagram showing a state of laser scanning and a state of application of laser to a place to be irradiated together with signals. First in an image take-in zone 701 of a sample surface, the laser light having each wavelength is subjected to scanning 702 (scanning A) in an arrow direction in the time series. A place 703 requires irradiation in the zone in which the image can be taken in. Noting scanning A 704 in a plurality of laser scanning operations 702, the signal 302 indicates the laser irradiation range data.

For example, when an acoustoopic device is driven by the laser irradiation range data signal 302, the actual laser irradiation position 82, which is different from the laser irradiation position 81 to be irradiated, shown in FIG. 10 is irradiated. On the other hand, in the present embodiment, the laser irradiation position 81 to be irradiated can be irradiated with laser light by driving the acoustoopic device by the acoustooptic device driving signal 303.

According to the first embodiment, the driving signal for driving each acoustooptic device is corrected by the use of the information of the delay time concerning inputs/outputs of a plurality of acoustooptic devices. That is, when the laser irradiation range data is shifted by a delay time inherent in the acoustooptic device, it is possible to correct the shift of the irradiation region for each acoustooptic device, caused when a plurality of types of acoustooptic devices are driven by the same laser scanning synchronous signal. Therefore, when the lasers having a plurality of wavelength bands are used, each of the laser irradiation positions correspond each other, and it is possible to correctly apply each laser to the region to be irradiated by the user. That is, even when each response time of acoustoopic devices is different from each other, each of the laser irradiation positions corresponds without the shift.

Figure 5:
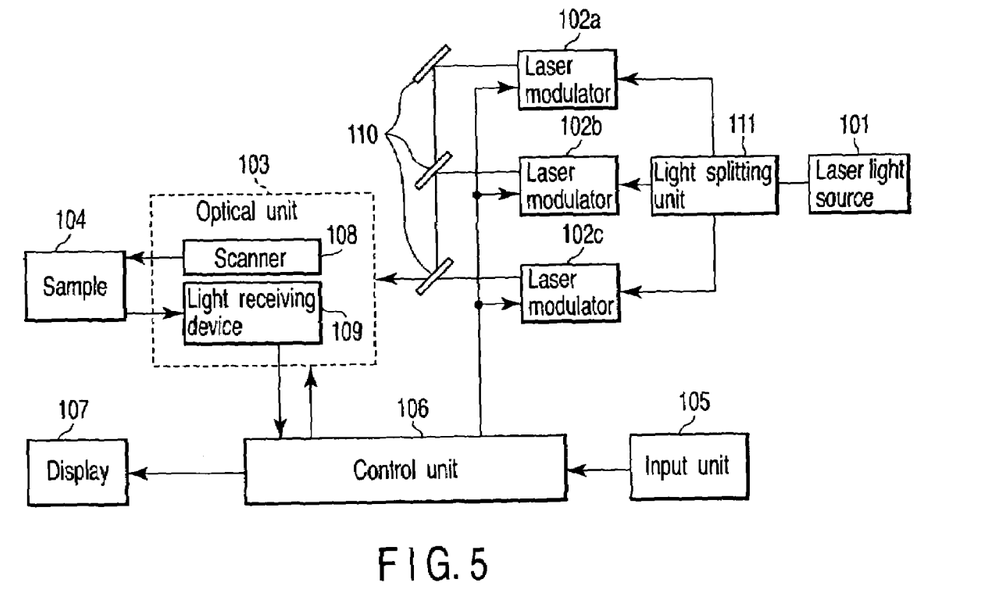
FIG. 5 is a diagram showing a configuration of a modification of the scanning laser microscope according to the first embodiment of the present invention.

It is to be noted that as a modification of the configuration of FIG. 1, as shown in FIG. 5, one laser light source 101 is disposed, and a plurality of laser modulators 102a, 102b, 102c are disposed. In this case, the laser light source 101 emits the laser light having a plurality of wavelengths, and the laser light having the plurality of wavelengths is split into the respective wavelengths by a light splitting unit 111. The split laser light is guided into the respective laser modulators 102a, 102b, 102c. The subsequent process is similar to that of the first embodiment.

In the first embodiment, each delay amount for each acoustooptic device 206a, 206b, 206c is stored in the delay time storage section 202 disposed in the control circuit 207, necessary delay data is selectively read, the acoustooptic device driving signal 303 is produced based on the delay data, and one of the acoustooptic devices 206a, 206b, 206c is driven in the time series.

In the second embodiment, the control circuit 207 shown in FIG. 2 is disposed in each acoustooptic device 206a, 206b, 206c, the delay time of the corresponding acoustooptic device 206a, 206b, 206c is stored in the delay time storage section 202 of each control circuit 207, and one of the acoustooptic devices 206a, 206b, 206c is driven in the time series. It is to be noted that since the constitution of the scanning laser microscope is similar to that of the first embodiment, the description is omitted.

Figure 6:
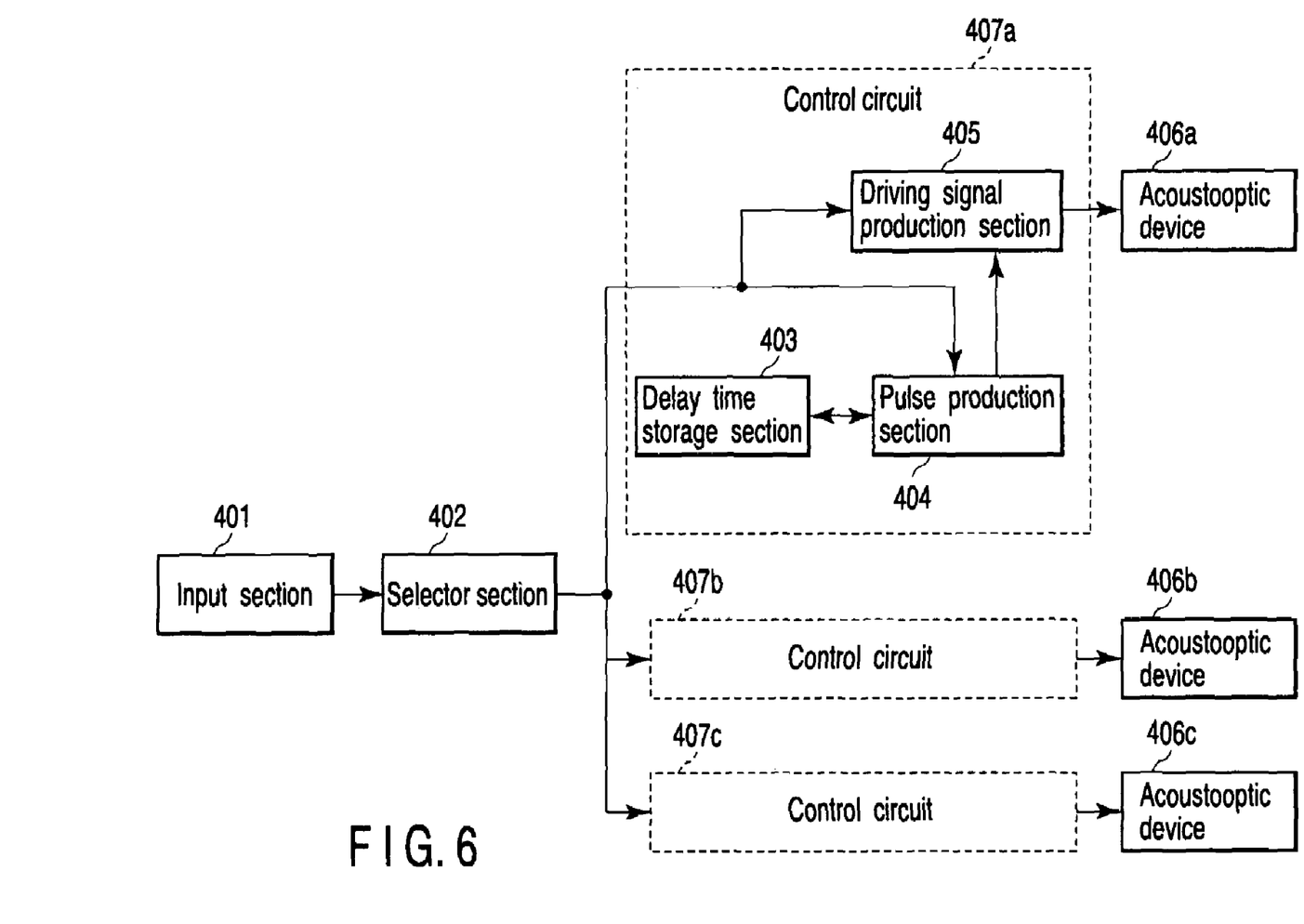
FIG. 6 is a diagram showing a configuration of a part of the scanning laser microscope according to a second embodiment of the present invention in detail.

FIG. 6 is a diagram showing a configuration of a 20 part of the scanning laser microscope according to the second embodiment in detail. In FIG. 6, acoustooptic devices 406a, 406b, 406c are driven by a driving signal produced in response to an input signal.

A configuration of FIG. 6 is configured with an input section 401, a selector section 402, a plurality of control circuits 407a 407b, 407c, and a plurality of acoustooptic devices 406a, 406b, 406c. Each of the control circuits 407a 407b, 407c corresponds to each acoustooptic device 406a 406b, 406c. Each control circuit 407a 407b, 407c is configured with a delay time storage section 403, a pulse production section 404, and a driving signal production section 405. The delay time storage section 403, pulse production section 404, driving signal production section 405, and selector section 402 are included in the control unit 106 of FIG. 1.

In the input section 401, the user inputs laser irradiation range data indicating a laser irradiation range, a laser scanning synchronous signal indicating a laser scanning method, and acoustooptic device data indicating information of the selected acoustooptic device 406a, 406b, 406c.

The selector section 402 outputs the laser scanning synchronous signal and the laser irradiation range data to the control circuit 407a, 407b, 407c which drives one designated acoustooptic device 406a, 406b, 406c in accordance with the acoustooptic device data from the input section 401.

The pulse production section 404 produces a trigger pulse from the laser irradiation range data and the laser scanning synchronous signal from the selector section 402, and the delay time data called from the delay time storage section 403. In the delay time storage section 403, the delay time data of the acoustooptic device 406a, 406b, 406c operated by the control circuit 407a, 407b, 407c is stored.

The driving signal production section 405 produces a driving signal for driving the corresponding acoustooptic device 406a, 406b, 406c from the laser irradiation range data and the laser scanning synchronous signal from the selector section 402 and the trigger pulse from the pulse production section 404. The control circuit 407a, 407b, 407c controls the corresponding acoustooptic device (modulating section) 406a, 406b, 406c by the driving signal in the time series as described later.

A procedure for obtaining the acoustooptic device driving signal 303 will be described hereinafter with reference to FIGS. 3 and 6.

First, by the use of the input section 401, the user inputs information indicating the one acoustooptic device 406a, 406b, 406c to be used, the laser wavelength, or the laser light source (any one is assumed as the acoustooptic device data), a laser scanning synchronous signal 301, and a laser irradiation range data signal 302.

The acoustooptic device data output from the input section 401 is input into the selector section 402. The selector section 402 outputs the laser scanning synchronous signal 301 and the laser irradiation range data signal 302 to the control circuit 407a, 407b, 407c which drives one designated acoustooptic device 406a, 406b, 406c.

The corresponding pulse production section 404 requests the delay time storage section 403 for the delay time data signal 304, when the laser scanning synchronous signal 301 and the laser irradiation range data signal 302 output from the selector section 402 are input. The delay time storage section 403 outputs the requested delay time data signal 304 to the pulse production section 404.

It is to be noted that a production method of the trigger pulse 305 in the pulse production section 404 is similar to that of the first embodiment. A method in which the driving signal production section 405 produces the acoustooptic device driving signal 303 from the laser scanning synchronous signal 301 and the laser irradiation range data signal 302 of the selector section 402 and the trigger pulse 305 produced by the pulse production section 404 is similar to that of the first embodiment. The corresponding acoustooptic device 406a, 406b, 406c is driven by the driving signal 303 output from the driving signal production section 405.

According to the second embodiment, a function/effect similar to that of the first embodiment is obtained.

In the first embodiment, each laser light source 101a, 101b, 101c and each laser modulator 102a, 102b, 102c constitutes one unit, and a plurality of units are disposed.

Figure 7:
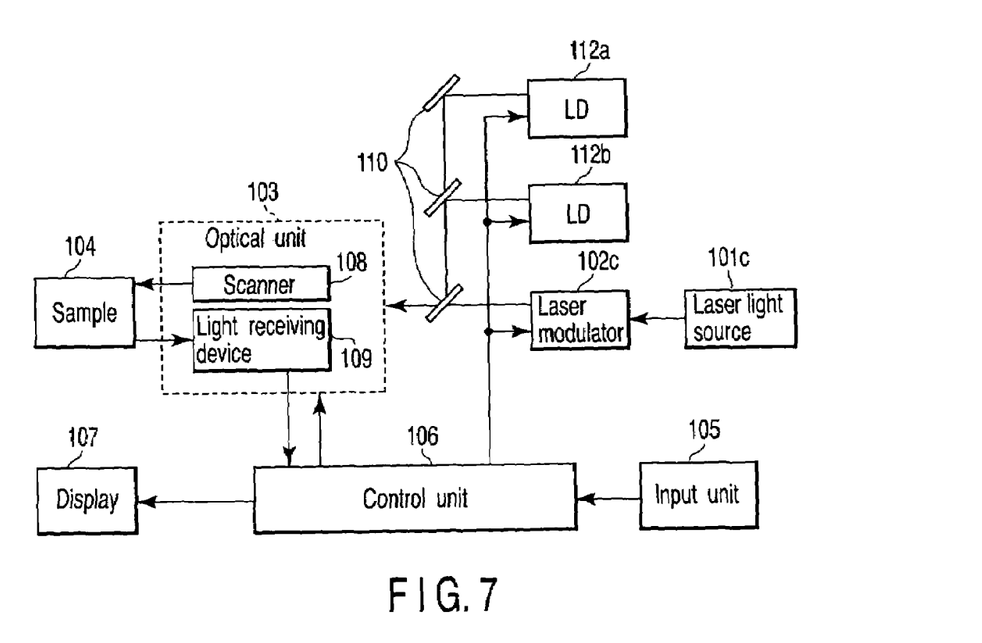
FIG. 7 is a diagram showing a configuration of the scanning laser microscope according to a third embodiment of the present invention.

In a third embodiment, as shown in FIG. 7, by the use of a device in which one of the laser light sources 101a, 101b, 101c and one of the laser modulators 102a, 102b, 102c shown in FIG. 1 are integrated (i.e. 101a and 102a, 101b and 102b), for example, by use of laser diodes (LD) 112a, 112b, the controlling is performed in the same manner as in the first embodiment.

In the configuration of the third embodiment, as described above, one of the laser light sources 101a, 101b and the corresponding one of the laser modulators 102a, 102b shown in FIG. 1 constitute one unit. The other configuration is similar to that of the first embodiment. It is to be noted that even where the unit such as LD 112a, 112b, in which a laser source and a laser modulator are integrated, and separate laser source 101c and laser modulator 102c are mixed as shown in FIG. 7, it is possible to correctly apply each laser to the region to be irradiated by the user.

According to the third embodiment, the function/effect similar to that of the first embodiment is obtained.

In the first and second embodiments, the acoustooptic device driving signal is produced from the delay data, the laser scanning synchronous signal, and the laser irradiation range data stored beforehand in the delay time storage sections 202, 403, and the acoustooptic device is driven in the time series.

In a fourth embodiment, an acoustooptic device driving signal is produced with respect to an acoustooptic device having a longest delay time among a plurality of acoustooptic devices by the control circuit which drives the acoustooptic device in the same manner as in the first and second embodiments. With respect to the other acoustooptic devices, the driving signal of each acoustooptic device is produced by the use of the driving signal without using the laser scanning synchronous signal, and the respective acoustooptic devices are driven in the time series. It is to be noted that since the configuration of the scanning laser microscope is similar to that of the first embodiment, the description is omitted.

Figure 8:
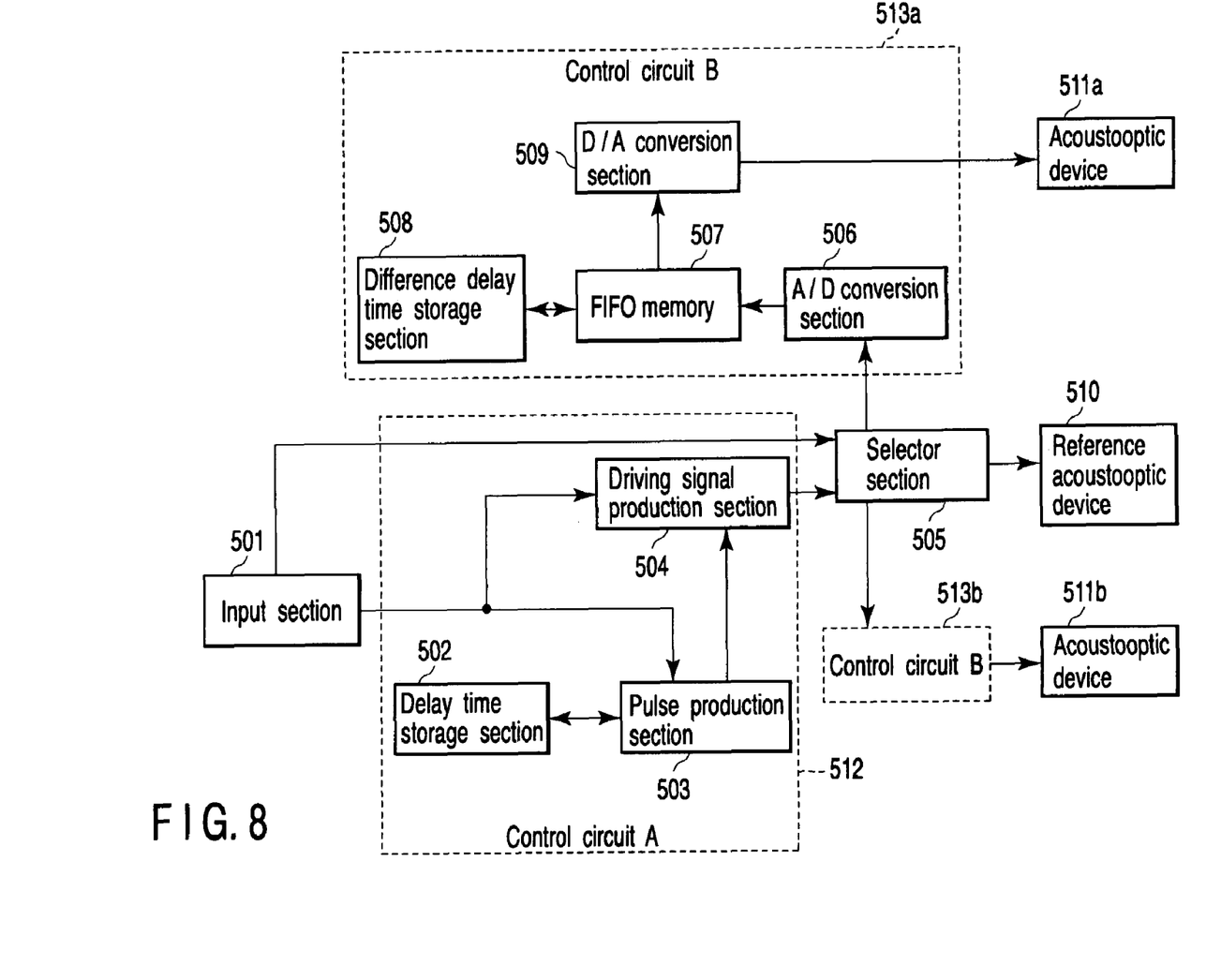
FIG. 8 is a diagram showing a configuration of a part of the scanning laser microscope according to a fourth embodiment of the present invention.

FIG. 8 is a diagram showing a configuration of a part of the scanning laser microscope according to the fourth embodiment. In FIG. 8, the acoustooptic device is driven by a driving signal produced in response to an input signal.

A configuration of FIG. 8 is configured with an input section 501, a control circuit A 512, a plurality of control circuits B 513a, 513b, a selector section 505, a reference acoustooptic device 510, and a plurality of acoustooptic devices 511a, 511b. The control circuit A 512 is constituted of a delay time storage section 502, a pulse production section 503, and a driving signal production section 504. Each of the control circuits B 513a, 513b is constituted of an A/D conversion section 506, an FIFO memory 507, a difference delay time storage section 508, and a D/A conversion section 509. The delay time storage section 502, pulse production section 503, and driving signal production section 504 of the control circuit A 512 are included in the control unit 106 of FIG. 1. The A/D conversion section 506, FIFO memory 507, difference delay time storage section 508, and D/A conversion section 509 of the control circuit B 513a, 513b are included in the control unit 106 of FIG. 1. Each of the control circuits B 513a, 513b is disposed corresponding to each of the acoustooptic devices 511a, 511b other than the reference acoustooptic device 510.

In the input section 501, the user inputs laser irradiation range data indicating a laser irradiation range, a laser scanning synchronous signal indicating a laser scanning method, and acoustooptic device data indicating information of the selected acoustooptic devices 510, 511a, 511b.

The pulse production section 503 of the control circuit A 512 produces a trigger pulse from the laser irradiation range data and the laser scanning synchronous signal output from the input section 501, and delay time data called from the delay time storage section 502 in which the delay time data of the reference acoustooptic device 510 is stored.

The driving signal production section 504 produces a driving signal for driving the corresponding acoustooptic devices 510, 511a, 511b from the laser irradiation range data and laser scanning synchronous signal from the input section 501, and the trigger pulse from the pulse production section 503.

The selector section 505 outputs the driving signals to the one designated acoustooptic device 510, 511a, 511b in accordance with the driving signal produced by the driving signal production section 504 and the acoustooptic device data from the input section 501.

The A/D conversion section 506 of the control circuit B 513a, 513b A/D converts the driving signal from the selector section 505. In the difference delay time storage section 508, difference delay time data is stored indicating a difference between the delay time of the reference acoustooptic device 510 and that of the acoustooptic device 511a, 511b to be actually operated.

The FIFO memory 507 produces driving signal data from the digital data converted by the A/D conversion section 506 and the difference delay time data from the difference delay time storage section 508. The D/A conversion section 509 D/A converts the driving signal data from the FIFO memory 507 to produce a driving signal for driving the corresponding acoustooptic device 511a, 511b. The control circuit B 513a, 513b controls the corresponding acoustooptic device (modulating section) 511a, 511b by the driving signal in the time series as described later.

A procedure for obtaining an acoustooptic device driving signal 303 will be described hereinafter with reference to FIGS. 3 and 8.

First, by the use of the input section 501, the user inputs information indicating one acoustooptic device 510, 511a, 511b to be used, the laser wavelength, or a laser device (any one is assumed as the acoustooptic device data), a laser scanning synchronous signal 301, and a laser irradiation range data signal 302.

The laser scanning synchronous signal 301 and the laser irradiation range data signal 302 output from the input section 501 are input into the pulse production section 503 and the driving signal production section 504. Thereafter, a method in which the acoustooptic device driving signal 303 is produced by the pulse production section 503 and the driving signal production section 504 is similar to that of the first and second embodiments.

The acoustooptic device data output from the input section 501 and the driving signal 303 output from the driving signal production section 504 are input into the selector section 505. The selector section 505 guides the driving signal 303 to the control circuit B 513a, 513b which drives the designated acoustooptic device 511a, 511b, or the reference acoustooptic device 510. When the driving signal 303 is guided into the reference acoustooptic device 510, the reference acoustooptic device 510 is driven by the driving signal 303.

The driving signal 303 guided into the control circuit B 513a, 513b from the selector section 505 is converted into digital data by the A/D conversion section 506. The digital data is output to the FIFO memory 507 from the A/D conversion section 506. When the digital data is input into the FIFO memory 507, the FIFO memory 507 reads difference storage time data from the difference delay time storage section 508. The FIFO memory 507 delays the input digital data by a difference storage time, and outputs the digital data to the D/A conversion section 509. The D/A conversion section 509 converts the input digital data to the driving signal of the corresponding acoustooptic device 511a, 511b. The corresponding acoustooptic device 511a, 511b is driven by the driving signal.

According to the fourth embodiment, an effect similar to that of the first embodiment is obtained without using the laser scanning synchronous signal. Since the control circuit B 513a, 513b is capable of producing the driving signal without using the laser scanning synchronous signal, a laser oscillator and a modulator unit are easily attached later.

Moreover, when the number of control circuits 407a, 407b, 407c of FIG. 6 is limited in the third embodiment, the fourth embodiment is applied, one control circuit 407a, 407b, 407c is replaced with the similar control circuit A 512, and accordingly more acoustooptic devices can be controlled.

It is to be noted that the present invention is not limited to the above-described embodiments, and may also be appropriately modified within the scope. For example, each control circuit may also be realized by software. The acoustooptic device (modulating section) may also be substituted by a combination of an electrooptic device (EOM), a liquid crystal shutter, filter and the like with a shutter. For example, when the acoustooptic device is, for example, a laser diode (LD) or the like, an output intensity may also be converted by an electric signal. The delay time storage section may also store or input the delay time using PC, DIP switch, variable resistor or the like. In the scanning laser microscope, when the acoustooptic device (modulating section) does not have any input/output delay time, the acoustooptic device (modulating section) may also be directly driven without using the control circuit.

According to the present invention, there can be provided a scanning laser microscope which is capable of exactly controlling an irradiation position in a case where a plurality of modulating sections are used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A scanning laser microscope comprising:
   at least one laser light source for emitting laser light;
   a plurality of modulating sections for adjusting the laser light emitted from each laser light source;
   a storage section for storing delay time information on an input/output of each modulating section, the delay time information comprising information on a response time from a start of driving to development of a function of each modulating section; and
   a signal production section for producing a driving signal to drive at least one modulating sections selected from the plurality of modulating sections based on the delay time information of the at least one selected modulating section.

2. The scanning laser microscope according to claim 1, wherein at least one of the modulating sections comprises an acoustooptic device.

3. The scanning laser microscope according to claim 1, wherein the signal production section produces the driving signal to drive the at least one selected modulating section so as to cause the at least one selected modulating section to apply laser light from the at least one laser light source in a time series.

4. The scanning laser microscope according to claim 1, further comprising:
   a selector section which outputs the driving signal produced by the signal production section to the selected modulating section.

5. The scanning laser microscope according to claim 1, wherein the signal production section produces the driving signal based on the delay time information and information indicating a laser irradiation range.

6. The scanning laser microscope according to claim 5, wherein the signal production section produces the driving signal to drive the selected modulating section earlier by the delay time information with respect to information indicating the laser irradiation range.

7. The scanning laser microscope according to claim 1, wherein each of the modulating sections includes one said storage section and one said signal production section.

8. The scanning laser microscope according to claim 1, wherein at least one of the at least one laser light source is integrated with one corresponding modulating section.

9. The scanning laser microscope according to claim 8, wherein each said integrated laser light source and modulating section is configured to form a laser diode.

10. The scanning laser microscope according to claim 1, wherein each of the modulating sections adjusts at least one of intensity and wavelength of the laser light.

11. The scanning laser microscope according to claim 10, further comprising:
    a scanning section which two-dimensionally scans the laser light on a sample; and
    a setting section which sets an adjusted value of at least one of the intensity and the wavelength of the laser light with respect to a scanning position of the laser light scanned by the scanning section as laser light irradiation information,
    wherein the signal production section produces the driving signal to drive the at least one selected modulating section earlier by a time represented by the delay time information in synchronization with the scanning of the laser light by the scanning section, based on the laser light irradiation information set by the setting section.

12. A scanning laser microscope comprising:
at least one laser light source for emitting laser light;
a plurality of modulating sections for adjusting the laser light emitted from each laser light source;
a first storage section for storing delay time information on an input/output of a predetermined modulating section among the plurality of modulating sections, the delay time information comprising information on a response time from a start of driving to development of a function of the predetermined modulating section;
a second storage section for storing difference data on a difference between delay time information on an input/output of each modulating section other than the predetermined modulating section and the delay time information stored in the first storage section; and
a signal production section for producing a driving signal to drive at least one modulating section selected from the plurality of modulating sections based on the delay time information stored in the first storage section and the difference data stored in the second storage section.

13. The scanning laser microscope according to claim 12, wherein at least one of the modulating sections comprises an acoustooptic device.

14. The scanning laser microscope according to claim 12, wherein the signal production section produces the driving signal to drive the at least one selected modulating section so as to cause the at least one selected modulating section to apply laser light from the at least one laser light source in a time series.

15. The scanning laser microscope according to claim 12, wherein each of the modulating sections adjusts at least one intensity and wavelengh of the laser light.

16. The scanning laser microscope according to claim 15, further comprising:
a scanning section which two-dimensionally scans the laser light on a sample; and
a setting section which sets an adjusted value of at least one of the intensity and the wavelength of the laser light with respect to a scanning position of the laser light scanned by the scanning section as laser light irradiation information,
wherein the signal production section produces the driving signal to drive the at least one selected modulating section earlier by a time represented by the delay time information in synchronization with the scanning of the laser light by the scanning section, based on the laser light irradiation information set by the setting section.

17. A scanning laser microscope comprising:
at least one laser light irradiation means for irradiating laser light;
a plurality of modulating means for adjusting the laser light projected from each laser light irradiation means;
storage means for storing delay time information on an input/output of each modulating means, the delay time information comprising information on a response time from a start of driving to development of a function of each modulating means; and
a signal production means for producing a driving signal to drive at least one modulating means selected from the plurality of modulating means based on the delay time information of the at least one selected modulating means.

18. A scanning laser microscope comprising:
at least one laser light irradiation means for irradiating laser light;
a plurality of modulating means for adjusting the laser light projected from each laser light irradiation means;
first storage means for storing delay time information on an input/output of a predetermined modulating means among the plurality of modulating means, the delay time information comprising information on a response time from a start of driving to development of a function of the predetermined modulating section;
second storage means for storing difference data on a difference between delay time information on an input/output of each modulating means other than the predetermined modulating means and the delay time information stored in the first storage means; and
signal production means for producing a driving signal to drive at least one modulating means selected from the plurality of modulating means based on the delay time information stored in the first storage means and the difference data stored in the second storage means.

19. A laser scanning method comprising:
adjusting a plurality of laser beams projected from at least one laser light source by a plurality of modulating sections;
storing delay time information on inputs/outputs of the respective modulating sections, the delay time information comprising a information on a response time from a start of driving to development of a function of the respective modulating sections; and
producing a driving signal to drive at least one modulating section selected from the plurality of modulating sections based on the delay time information of the at least one selected modulating section.

20. A laser scanning method comprising:
adjusting a plurality of laser beams projected from at least one laser light source by a plurality of modulating sections;
storing delay time information on an input/output of a predetermined modulating section among the plurality of modulating sections, the delay time information comprising information on a response time from a start of driving to development of a function of the predetermined modulating section;
storing difference data on a difference between delay time information on an input/output of each modulating section other than the predetermined modulating section and the stored delay time information; and
producing a driving signal to drive at least one modulating section selected from the plurality of modulating sections based on the stored delay time information and the stored difference data.

* * * * *